(12) United States Patent
Silvio

(10) Patent No.: US 12,710,330 B2
(45) Date of Patent: Aug. 18, 2026

(54) EVALUATION OF THE MEASUREMENT SIGNAL FROM A VACUUM LEAK DETECTOR

(71) Applicant: INFICON GmbH, Cologne (DE)

(72) Inventor: Decker Silvio, Cologne (DE)

(73) Assignee: INFICON GmbH, Cologne (DE)

( * ) Notice: Subject to any disclaimer, the term of this patent is extended or adjusted under 35 U.S.C. 154(b) by 184 days.

(21) Appl. No.: 18/577,979

(22) PCT Filed: Jul. 12, 2022

(86) PCT No.: PCT/EP2022/069491
§ 371 (c)(1),
(2) Date: Jan. 9, 2024

(87) PCT Pub. No.: WO2023/006413
PCT Pub. Date: Feb. 2, 2023

(65) Prior Publication Data

US 2024/0319033 A1 Sep. 26, 2024

(30) Foreign Application Priority Data

Jul. 26, 2021 (DE) ..................... 10 2021 119 302.8

(51) Int. Cl.
*G01M 3/04* (2006.01)

(52) U.S. Cl.
CPC .................................... *G01M 3/04* (2013.01)

(58) Field of Classification Search
CPC ......... G01M 3/04; G01M 3/007; G01M 3/229
See application file for complete search history.

(56) References Cited

U.S. PATENT DOCUMENTS

| | | | | |
|---|---|---|---|---|
| 5,551,285 | A | 9/1996 | Gannon | |
| 10,768,146 | B1 * | 9/2020 | Burtea | G01N 29/032 |
| 2013/0318917 | A1 * | 12/2013 | Nilsson | G01M 3/3281 73/49.3 |
| 2016/0178472 | A1 * | 6/2016 | Watanabe | G01M 3/202 73/40.7 |

FOREIGN PATENT DOCUMENTS

| | | | |
|---|---|---|---|
| CN | 102317753 | A | 1/2012 |
| CN | 103207050 | A | 7/2013 |
| DE | 19942185 | A1 | 3/2001 |
| DE | 112014004741 | T5 | 1/2017 |
| EP | 2686657 | A1 | 1/2014 |
| EP | 3527966 | A1 | 8/2017 |

(Continued)

*Primary Examiner* — Tarun Sinha
(74) *Attorney, Agent, or Firm* — Kirton McConkie; Whitney Blair

(57) ABSTRACT

A method for evaluating the measuring signal of a vacuum leak detector comprising a vacuum pump (16) and a test chamber (12) connected with the vacuum pump (16) and a gas detector (14) connected with the test chamber (12), characterized by determining the system time constant $\tau$ of the vacuum leak detector, wherein the system time constant $\tau$ is the duration of the system-related rise of the measured signal in response to a gas component escaped through a leak in the test object or the duration of the system-related drop of the measured signal in response to a gas component no longer from a leak in the test object.

18 Claims, 6 Drawing Sheets

(56) References Cited

FOREIGN PATENT DOCUMENTS

| | | | |
|---|---|---|---|
| EP | 3499206 | A1 | 6/2019 |
| JP | H059759 | A | 1/1993 |
| JP | 2019510228 | A | 4/2019 |
| JP | 2020536364 | A | 12/2020 |
| TW | 200615527 | A | 5/2006 |

* cited by examiner

EVALUATION OF THE MEASUREMENT SIGNAL FROM A VACUUM LEAK DETECTOR

This application is a National Stage of International Application No. PCT/EP2022/069491, filed Jul. 12, 2022, and entitled EVALUATION OF THE MEASUREMENT SIGNAL FROM A VACUUM LEAK DETECTOR, which claims priority to German Patent Application No. DE 10 2021 119 302.8, filed Jul. 26, 2021, which are each incorporated herein by reference in their entirety.

The invention relates to a method and a device for evaluating the measuring signal of a vacuum leak detector.

Vacuum leak detectors are used to detect leaks in test objects. For this purpose, a vacuum leak detector comprises a test chamber for the test object, as well as a vacuum pump connected to the test chamber for the evacuation of the test chamber, and a gas detector connected to the test chamber and configured to analyze the gas drawn from the test chamber. The gas detector is designed in particular to detect a test gas present in the test object, which reaches the test chamber through a leak in test object and is supplied from there to the gas detector.

The suction capacity of the vacuum leak detector for the test gas used, mostly helium, is determined by the vacuum pump used, as well as by the cross section and the length of the connection to the test chamber, i.e. by the volume of the gas conduction path between the test chamber and the gas detector. This effective test gas suction capacity determines the system time constant of the vacuum leak detector relative to the volume of the test object. The system time constant is the duration of the system-related rise of the measured signal in response to a gas component at the gas sensor or the duration of the system-related drop of the measured signal in response to a gas component being no longer present at the gas sensor. Here, the gas component at the gas sensor typically is the test gas component that has escaped through a leak and is to be detected for leak detection. Typically, the system time constant is assumed to be the time period that elapses until the measuring signal drops to the 1/e-th part thereof or until the measuring signal rises to the (1-1/e)-th part, when a leak is sprayed with test gas or is opened or when a leak is no longer sprayed or is closed. Simplifying, the vacuum time constant of the vacuum leak detector may also be assumed as the system time constant. The vacuum time constant is equal to the volume of the test object or the test chamber divided by the effective suction capacity of the vacuum leak detector.

The suction capacity can be increased by a larger pump, an enlarged volume or an enlarged cross section, whereby the capability/performance and the response time are improved. However, the volume, the cross section and the size of the pump can not be increased at will. In addition, the resulting amplitude of the leak signal is reduced with large volumes, making leak detection more difficult.

It is an object of the invention to provide a method and a device which enable an improved signal evaluation with a shortened response time.

The method according to the invention is defined by the features of claim 1. The device according to the invention is defined by the features of claim 16.

According to the method of the invention, the system time constant $\tau$ of the vacuum leak detector is determined first. The system time constant $\tau$ represents the response time of the system with respect to a change in the gas conditions at the gas detector. The system time constant $\tau$ thus corresponds to the duration of the system-related rise of the measured signal in response to the detection of a gas component that has escaped through a leak in the test object and/or to the duration of the system-related drop of the measured signal in response to a gas component from a gas leak being no longer detected. In the simplest case, the system time constant $\tau$ corresponds, for example, to the time that elapses until the measuring signal has decayed to a 1/e-th part of the original signal, where e is Euler's number.

After the system time constant has been determined, the actual leak detection is performed by placing a test object in the test chamber and evacuating the test chamber by means of the vacuum pump. A measuring signal I(t) of the gas drawn from the test chamber is generated by the gas detector at a current time t. The current time t may be, for example, the start of a new measurement or of a new measurement series, wherein, within a measuring series, measurements may be performed at regular intervals t0.

From this measuring signal I(t), a measuring signal Í(t+t0) prognosed for a future time t+t0 is determined, assuming a dropping signal exclusively following the system time constant, typically an exponential drop. This means that for determining the prognosed signal, it is assumed that the measuring signal I is subjected to a purely exponential change and to changes corresponding to the system time constant determined, i.e. that at the time t+t0, substantially the gas components are present at the detector as is exponentially expected under aspects of vacuum technology at the time t, since no test gas flows through a leak into the test volume, so that the prognosed measuring signal Í(t+t0) is determined solely in consideration of the signal path during the system time constant $\tau$. The system time constant $\tau$ typically is a few seconds or some 10 seconds, for example about 30 seconds. Starting from the time t, the time t+t0 lies in the future by at most the system time constant $\tau$, i.e. $\tau$>t0. Preferably, t0 is an n-th part of $\tau$, where n is a natural number. Typically, t0 is in the range of a few seconds, in particular in the case of a measurement series with measurements recurring at regular intervals t0.

The prognosed measuring signal Í(t+t0) thus indicates to which value the measuring signal I(t) will have risen or dropped after the lapse of the time t0<$\tau$, if no test gas flows into the test volume through a leak, i.e. the gas conditions at the gas detector do not change. Thereby, the prognosed measuring signal Í(t+t0) is intended to be used for a comparison with the real measuring signal I(t+t0) at the time t0, so as to judge, whether the same gas conditions prevail at the gas detector at the time to as at the time t. To this end, the difference between the prognosed measuring signal Í(t+t0) and the actually measured measuring signal at the time t+t0 is used for the evaluation of the leakage. Conventionally, such an evaluation is possible only after the lapse of the system time constant. Therefore, the measuring signal thus prognosed will also be referred to as an accelerated measuring signal in the present description.

The prognosed measuring signal Í(t+t0) can be formed from the measured measuring signal I(t) by multiplying the measuring signal I(t) by a constant C2, where 0<C2<1. The comparison between the real measuring signal I(t+t0) and the prognosed (accelerated) measuring signal Í(t+t0) is performed by calculating the difference between the measuring signal I(t+t0) and the accelerated measuring signal Í(t+t0).

According to the invention, it is assessed, based on the difference thus calculated, i.e. for example I(t+t0)−C2 I(t+t0), whether the test object has a leak. If, for example, the difference is particularly great, this may be considered as indicating a leak, since the detector detects an additional gas component previously not present, while a particularly small difference may indicate unchanged conditions at the detector or a tight test object. To this end, the difference can be compared to a threshold value, for example. Thus, an accelerated leak test or leak detection is enabled with knowledge and use of the system time constant τ.

Preferably, the difference between the prognosed measuring signal and the actually measured measuring signal at the time t+t0 is multiplied by a constant C1, so as to adjust the difference numerically to the actual leakage rate. C1 and/or C2 are real numbers, preferably, C2 is between 0 and 1 and C1 is greater than 1.

The prognosed measuring signal Í(t+t0) prognosed for the time t+t0 is determined by assuming an exponentially decaying characteristic for the measured signal I(t), which after the lapse of the system time constant τ at the time t+τ is only about 36% of the value of the measured signal I(t). In other words, it is assumed that the signal I(t) decays exponentially and, at the time t+τ, corresponds to a part of the signal I(t) multiplied by a factor, the factor including the term 1/e. For example, the signal I(t+τ) at the time t+τ may correspond to only 1/e times the signal I(t) at the time t. From such an exponentially decaying signal characteristic, it is then possible to determine the associated signal value of the signal Í(t+t0) for each optional time t+t0 with 0<t0<τ.

For example, in the case of a measuring signal rising in the presence of a leaking gas, e.g. in the case of a leaking gas partial pressure measurement (e.g. helium as the leaking gas), it may be assumed that a leak exists as soon as the difference exceeds a predetermined threshold value. The threshold value may also be 0. In the case of a measuring signal that is reduced by a leaking gas present, it can be assumed that a leak exists in the test object, if the difference is less than a predetermined threshold value (e.g. 0).

When comparing the difference with a threshold value, it can preferably be checked, whether the difference is a) higher than the threshold value, b) in a range between zero and the threshold value and/or c) less than zero, i.e. negative. In case a), it can then be assumed that the test object has a leak. In case b), it can be assumed that the test object has no leak. In case c), it can be assumed that an error exists, e.g. in the form of an incorrect system time constant.

The threshold value may serve to take into consideration a background signal in the form of, for example, a background noise of the measuring signal after the lapse of the system time constant. The background signal may result from signal noise and/or an offset signal. The offset signal may result, for example, from gas components that are outgassed internally from the walls of the leak detection system. The threshold may be set to, for example, 5-10 times the value of the background noise or of the background signal averaged over a period of time.

It is further advantageous to use a difference averaged over a period of time, when comparing the difference with a threshold value, so as to ignore temporary outliers of the measuring signal.

The system time constant t can be determined using a test leak, e.g. a spray-on leak, or it can be calculated from the volume of the test chamber and the suction capacity of the vacuum pump.

The system time constant τ is determined from the velocity of the rise or the drop of the measuring signal, i.e. the measured leak rate signal, when a leak is connected or disconnected, i.e. when a leak is sprayed or the spraying of a leak is ended.

Here, the system time constant τ can be determined directly from that time that elapses until the measuring signal has dropped to 1/e of the measuring signal that is generated by a test leak, for example, or measured. The system time constant τ can be determined directly from that time that elapses until the measured leak rate signal has risen to (1-1/e) times the measuring signal of a test leak.

As an alternative or in addition, the system time constant τ can be determined through the formula τ=t/Ln(I(t=0))−In (I(t=t)), where I(t=0) is the measuring signal at the time of deactivation, removal or switching off of a test leak, and I(t=t) is the measuring signal at an optional time t after deactivation of the test leak.

Here, the system time constant can also be determined by I(t=0) in the above formula being the measuring signal which results as the difference of the measuring signal upon deactivation of the test leak and before activation of the test leak, and I(t=t) being the difference between the measuring signal at the time t after deactivation of the test leak and before opening the same.

The basic idea is to accelerate the signal technically. The system time constant of the system is a fixed, technically measurable value and can be measured by the leak detector itself by activating or deactivating a suitable test leak. Die to the known time behavior, it can be predicted at any time. how the signal will behave when no test gas is sprayed at that moment. This can be expressed mathematically by the following relationship:

$$\acute{I}(t) = \left(\left(I(t) - F\frac{I\left(t - \frac{\tau}{n}\right)}{\sqrt[n]{e}}\right)\frac{1}{\left(1 - \frac{1}{\sqrt[2]{e}}\right)}\right)$$

- I(t): signal leak rate at the time t
- Í(t): accelerated leak rate signal
- I(t−τ/n): signal of the leak rate at the time t−τ/n
- F: factor for the leak rate suppression (0.9 . . . 0.999)
- n: boost factor (how much higher the virtual suction capacity is compared to the physical one), where n is a natural number
- τ: System time constant which results e.g. from the effective suction capacity and volume. The latter must be measured in advance by the system.

The resultant signal Í(t) is accelerated by the factor (n+1) compared to the leak rate signal I(t). Besides the acceleration, it is also possible to indicate a desired system time constant (the time at which, due to spraying, the signal has risen to the end value). n is then obtained from the desired system time constant $\tau_w$ as $n=\tau/\tau_w$. The disadvantage of the filter is the amplification of the noise to the original signal. Here, it is favorable to adjust the spraying period of the test gas to the desired system time constant of the filter (or vice versa). In this case, the effective noise of the signal increases by only 40%, regardless of the acceleration factor n. Further, knowing the system time constant τ makes it possible to design the filtering of the original leak rate signal I(t) such that with larger system time constants I(t) also the filter system time constant (the time range over which the average is formed) can be adjusted. Since the system time constant is the fastest system response physically possible, averaging can be performed over a greater time range without slowing down the signal response. Thereby, the noise of the filter can be reduced effectively. (Larger volumes require stronger acceleration, but also allow for a greater time period for signal averaging and thus for less noise).

1) Determination of the system time constant for leak rate measurement using a suitable method (internal test leak, external test leak, spray-on leak, input of volume and suction capacity)

2) Possibly Filtering of the leak rate signal adjusted to the system time constant 3) Acceleration of the signal using the above formula 4) Possibly Adjustment of the desired system time constant (boost factor) to the test gas spraying period or adjustment of the spraying time to a set system time constant.

Results:

A signal transformation of the form:

$$\dot{I}(t) = \left(I(t) - F\frac{I\left(t-\frac{\tau}{n}\right)}{\sqrt[n]{e}}\right)\frac{1}{\left(1-\frac{1}{\sqrt[n]{e}}\right)}$$

I(t): signal leak rate at the time t

I(t−τ/n): signal of the leak rate at the time t−τ/n

F: factor for the leak rate suppression (0.9 . . . 0.999)

n: boost factor (how much higher the virtual suction capacity is compared to the physical one)

τ: System time constant which may result e.g. from the effective suction capacity and volume. The latter must be measured in advance by the system.

Results in an acceleration of the measuring signal. The prerequisite is that the system time constant of the system is determined in advance using e.g. an internal test leak.

Approach and Basic Idea

With vacuum leak detectors, the relationship between the effective suction capacity and the chamber volume determines the system time constant, i.e. the maximum rate at which a signal can rise or fall. In physical terms, a signal cannot rise or fall faster, only slower, due to e.g. permeation or degassing of surfaces or to the evacuation of hidden volumes. Leaving all slow effects aside, the signal behavior can always be described by a simple e-function.

For rising signals, the function is as follows:

$$I(t) = I_0\left(1-\exp\left(-\frac{t}{\tau}\right)\right),$$

for falling signals, it is as follows:

$$I(t) = I_0\left(\exp\left(-\frac{t}{\tau}\right)\right).$$

Since this is an exponential function, it is always possible to use the signal I(t) to also determine the maximum possible change of I(t) (by derivation). The maximum possible derivation (rise or fall) is always known and results from the leak rate signal.

The basic idea is to act at each point in the signal as if the signal were falling at this moment. That is, the maximum physically possible change is always subtracted from the signal. Since this is an e-function, it is feasible to express this in units of the system time constant.

When the transformation is performed, the modified leak rate signal Í(t) is obtained.

$$\dot{I}(t) = I(t) - I\left(t-\frac{\tau}{n}\right)\exp\left(-\frac{t-\frac{\tau}{n}}{\tau}\right)$$

In words, this means: Take the current signal and subtract the signal of τ/n seconds before, which at most results in a falling change exp $$\left(-\frac{t-\frac{\tau}{n}}{\tau}\right)$$

within τ/n. n is a natural number.

Because of the exponential character, the equation can be simplified significantly.

$$\dot{I}(t) = I(t) - I\left(t-\frac{\tau}{n}\right)\exp\left(-\frac{1}{n}\right)$$

$$\dot{I}(t) = I(t) - \frac{I\left(t-\frac{\tau}{n}\right)}{\sqrt[n]{e}}$$

Now, it can be tested how the new signal behaves under the various conditions.

Rising Signal $$I(t) = I_0\exp\left(-\frac{t}{\tau}\right)$$

$$I(t) = I(t) - \frac{I\left(t-\frac{\tau}{n}\right)}{\sqrt[n]{e}}$$

$$I(t) = I_0\left(1-\exp\left(-\frac{t}{\tau}\right)\right) - \frac{I_0\left(1-\exp\left(-\frac{t-\tau/n}{\tau}\right)\right)}{\sqrt[n]{e}}$$

$$I(t) = I_0\left(1-\exp\left(-\frac{t}{\tau}\right)\right) - \frac{I_0\left(1-\exp\left(\frac{1}{n}\right)\exp\left(-\frac{t}{\tau}\right)\right)}{\sqrt[n]{e}}$$

$$I(t) = I_0 - I_0\exp\left(-\frac{t}{\tau}\right) - \frac{1}{\sqrt[n]{e}}\left(I_0 - I_0\exp\left(-\frac{t}{\tau}\right)\exp\left(\frac{1}{n}\right)\right)$$

$$I(t) = I_0 - I_0\exp\left(-\frac{t}{\tau}\right) - \frac{1}{\sqrt[n]{e}}I_0 + \frac{1}{\sqrt[n]{e}}I_0\exp\left(-\frac{t}{\tau}\right)\sqrt[n]{e}$$

$$I(t) = I_0\left(1-\frac{1}{\sqrt[n]{e}}\right)$$

Thus, ideally, the result obtained is a time-independent signal with a reduced amplitude. Time independence is always achieved exactly when both the signal at the time t and the signal at the time t−τ lie on the rising edge of the signal. Before that, the signal rises exponentially. Now, what does this mean? When helium is sprayed, the target amplitude is reached already after the predetermined time (τ/n). Although the signal is still rising, the filtered signal already outputs the final value. Usually, two system time constants are needed to almost reach the end value. A value of n=1 divides the effective system time constant in half, as it were; or, in other words, this results in doubling the suction capacity. However, one should rather speak of a virtual suction capacity. One may also use values significantly greater than 1. In this manner, with this filter, a vacuum leak detector could easily have a virtual suction volume of 200 l/s. As n is growing, the measuring signal becomes ever smaller.

$$\dot{I}(t) = I_0\left(1 - \frac{1}{\sqrt[n]{e}}\right)$$

Thus, if the leak rate is to be outputted, the signal has to be scaled by $$\frac{1}{\left(1 - \frac{1}{\sqrt[n]{e}}\right)}.$$

This causes an increase in errors or rather in noise.

Rising Signal $$I(t) = I_0\exp\left(-\frac{t}{\tau}\right)$$

$$\dot{I}(t) = I(t) - \frac{I\left(t - \frac{\tau}{n}\right)}{\sqrt[n]{e}}$$

$$\dot{I}(t) = I_0\exp\left(-\frac{t}{\tau}\right) - \frac{I_0}{\sqrt[n]{e}}\exp\left(-\frac{t - \frac{\tau}{n}}{\tau}\right)$$

$$\dot{I}(t) = I_0\exp\left(-\frac{t}{\tau}\right) - \frac{I_0}{\sqrt[n]{e}}\exp\left(\frac{1}{n}\right)\exp\left(-\frac{t}{\tau}\right)$$

$$\dot{I}(t) = I_0\exp\left(-\frac{t}{\tau}\right) - \frac{I_0}{\sqrt[n]{e}}\sqrt[n]{e}\exp\left(-\frac{t}{\tau}\right)$$

$$\dot{I}(t) = 0$$

By basically subtracting the signal to be expected, the result obtained is zero. However, the signal becomes zero only, if both at the time t and at the time t−τ/n the signal is on the constantly falling edge. If helium is sprayed, the signal is visible for almost exactly for the time τ/n.

Of course, a value of zero is not really useful for a leak detector. A minor error in the determination of the system time constant τ can cause negative leak rates and thus an absorption of the leaks. Ideally, the correction is scaled slightly using a parameter F to leave a small, but visible leak rate signal.

$$\dot{I}(t) = I(t) - F\frac{I\left(t - \frac{\tau}{n}\right)}{\sqrt[n]{e}}$$

A F of 0.9 reduces the leak rate indicated by one order of magnitude, a value 0.99 of F reduces it by two.

Stable Signal:

$$I(t) = I_0$$

$$\dot{I}(t) = I(t) - \frac{I\left(t - \frac{\tau}{n}\right)}{\sqrt[n]{e}}$$

$$\dot{I}(t) = I_0 - \frac{I_0}{\sqrt[n]{e}}$$

$$\dot{I}(t) = I_0\left(1 - \frac{1}{\sqrt[n]{e}}\right)$$

In the case of such a stable signal, the filter always provides a stable output signal. However, the signal level is lower by the factor $$\left(1 - \frac{1}{\sqrt[n]{e}}\right).$$

If the correct leak rate value is to be outputted, the resulting signal has to be scaled correspondingly.

SUMMARY OF THE FILTER

If it is desired both to avoid negative leak rate values and to indicate the correct leak rate, the transformation of the signal into the filtered signal is as follows.

$$\dot{I}(t) = \left(I(t) - F\frac{I\left(t - \frac{\tau}{n}\right)}{\sqrt[n]{e}}\right)\frac{1}{\left(1 - \frac{1}{\sqrt[n]{e}}\right)}$$

I(t): signal leak rate at the time t

I(t−τ/n): signal of the leak rate at the time t−τ/n

F: factor for the leak rate suppression (0.9 . . . 0.999)

n: boost factor (how much higher the virtual suction capacity is compared to the physical one)

τ: System time constant which may result e.g. from the effective suction capacity and volume. The latter must be measured in advance by the system.

Properties

The filter is designed such that, essentially, the signal for spray-on leaks is accelerated. That is, all signals for which changes result from the effective suction capacity and the volume.

Permeation, hidden volumes and background are not suppressed by the filter. On the one hand this is negative, since an offset is always visible, on the other hand, it makes is very easy for the user to differentiate between true leaks (capillary leaks) and permeation leaks. Particularly with leak detectors having a relatively low suction capacity (41) in combination with large volumes, the system time constant for capillary leaks is rather great at 20 s. Since the filter maps the signal path of capillary leaks, permeation leaks can be differentiated better, as these show a very different (1/root(t)) and slower signal path.

Prerequisite

The filter requires that the system time constant is known with sufficiently high accuracy. With unknown systems, this can be achieved only by measuring. This is possible with a vacuum leak detector having an internal or an external test leak. For this purpose, the test leak has to be opened and one has to wait at least until the signal is reasonably stable. Of course, the test leak has to be connected with the chamber. When the test leak is then switched off, the system time constant can be determined by measuring the decay time (e.g. to the 1/e-th part of the start signal). For large volumes and small effective suction capacities this may of course take up to one minute, but the user thus also acquires information about the system time constant and thus about the required spray time at the leak. The time invested for determining the system time constant is already compensated for within a few measuring points, due to the significantly shorter measuring time.

Noise

The filtered signal will show significantly more noise than the original signal of the leak detector. This is because at least two signal values are required at each time on the one hand, and on the other hand, because the useful signal becomes ever smaller as n increases. However, it has to be noted that very small leak rate indications are necessary for leak detectors, since the signals are low in the case of large volumes and a short spray time. However, this is compensated for by the filter. It may thus well be that the higher background noise does not have that much of a disturbing effect.

Embodiments will be explained hereunder with reference to the Figures. In the drawings:

FIG. 1 shows a diagram with the resulting signal paths of a first embodiment, FIG. 2 is a schematic illustration of the vacuum leak detector, FIG. 3 shows a diagram for determining the system time constant of the system, FIG. 4 shows another diagram for determining the system time constant, FIG. 5 shows another diagram for determining the system time constant, and FIG. 6 shows an example of a filtering to illustrate the accelerated signal and the system time constant.

In the embodiment of FIG. 1, the path of the upper trajectory shows the measuring signal of the gas detector and the lower trajectory shows the accelerated signal Í(t) for a volume of the test chamber and the gas-conducting connection between the test chamber and the das detector of 100 l, a suction capacity of the vacuum pump of 4 l per second and an acceleration factor (boost factor) n=1. A comparison between the path of the lower trajectory and the upper trajectory in FIG. 1 shows that the accelerated signal path Í(t) rises significantly faster than the actually measured path I(t).

FIG. 2 is a schematic illustration of the vacuum leak detector comprised of a test chamber 12, a gas detector 14 and a vacuum pump 16, the gas detector 14 being connected in a gas-conducting manner with the test chamber 12 via a gas-conduction path 18. The test chamber accommodates a test object 20 filled with a test gas. The gas detector 14 is electronically connected with an evaluation unit 22 which receives and processes the electronic measuring signal generated by the gas detector.

In another embodiment, a UL1000 with a 50 l barrels was used. As a controllable test leak, a limp valve was used in combination with a TI4-6. The data input for the filter was the leak rate signal in combination with the fixed filter, so as to be able on the one hand to avoid influences of different filtering times and on the other hand to be able to measure noise amplifications.

Various tests were performed with the limp valve being opened and closed, and the signal for different acceleration stages was examined. The signal drop and the signal rise were examined in particular, as well as the question, whether the leak rate prognosed in the filter is coherent or to what extent it differs. The filter was examined in the range between $1\times10^{-3}$ and $1\times10^{-9}$ mbar l/s.

1) The filter is functional.
2) The signal can be accelerated technically by a factor 32, so that a virtual suction capacity of conventional leak detectors of almost 1000 l/s can be made possible.
3) The determination of the system time constant required for the filter can be performed using the internal test leak and will take between 15 and 20 s.
4) The accelerated signal has a noise increased by the factor 1.4× when compared to the input signal, which is consistent with the theoretical assumption.
5) However, with short spray pulses (short relative to the system time constant), the noise is increased by a factor 1.4 only as long as the acceleration factor is not to great and is proportionate to the spray time.
8) The leak rate prediction is good and the filter causes very little signal over-/underload.
9) A smoothing of the input signal adapted to the actual system time constant significantly improves upon noise without significantly impairing the system time constant.
10) The waiting time for spraying after a large leak can be shortened to about one minute for a volume of 50 l.

Figure 1:
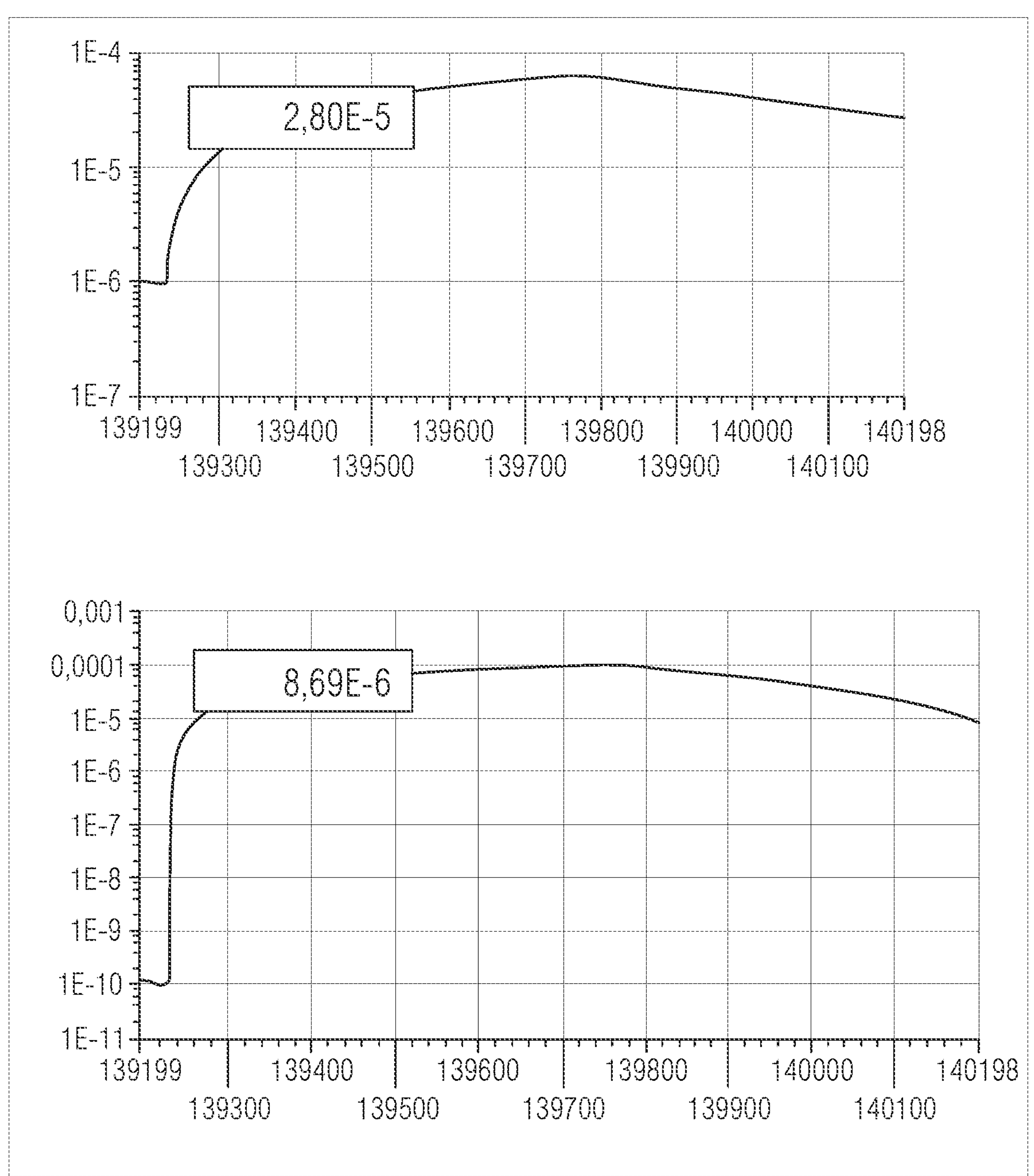
Figure 2:
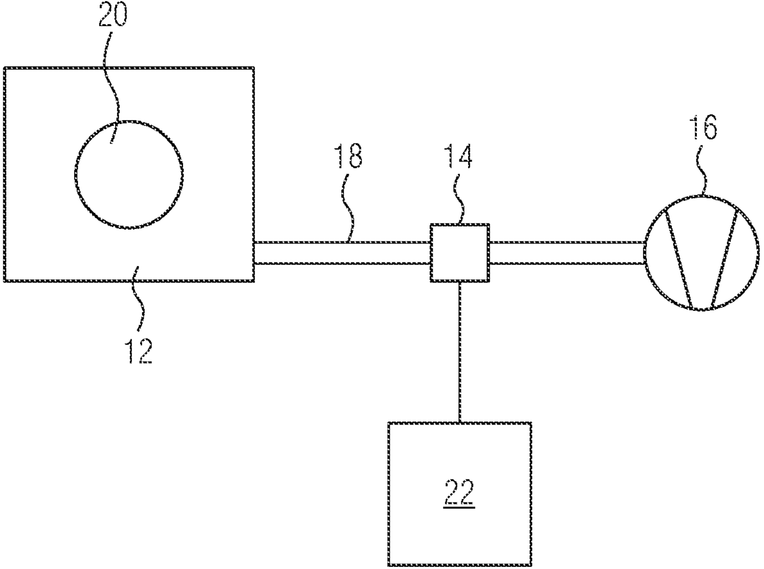
Figure 3:
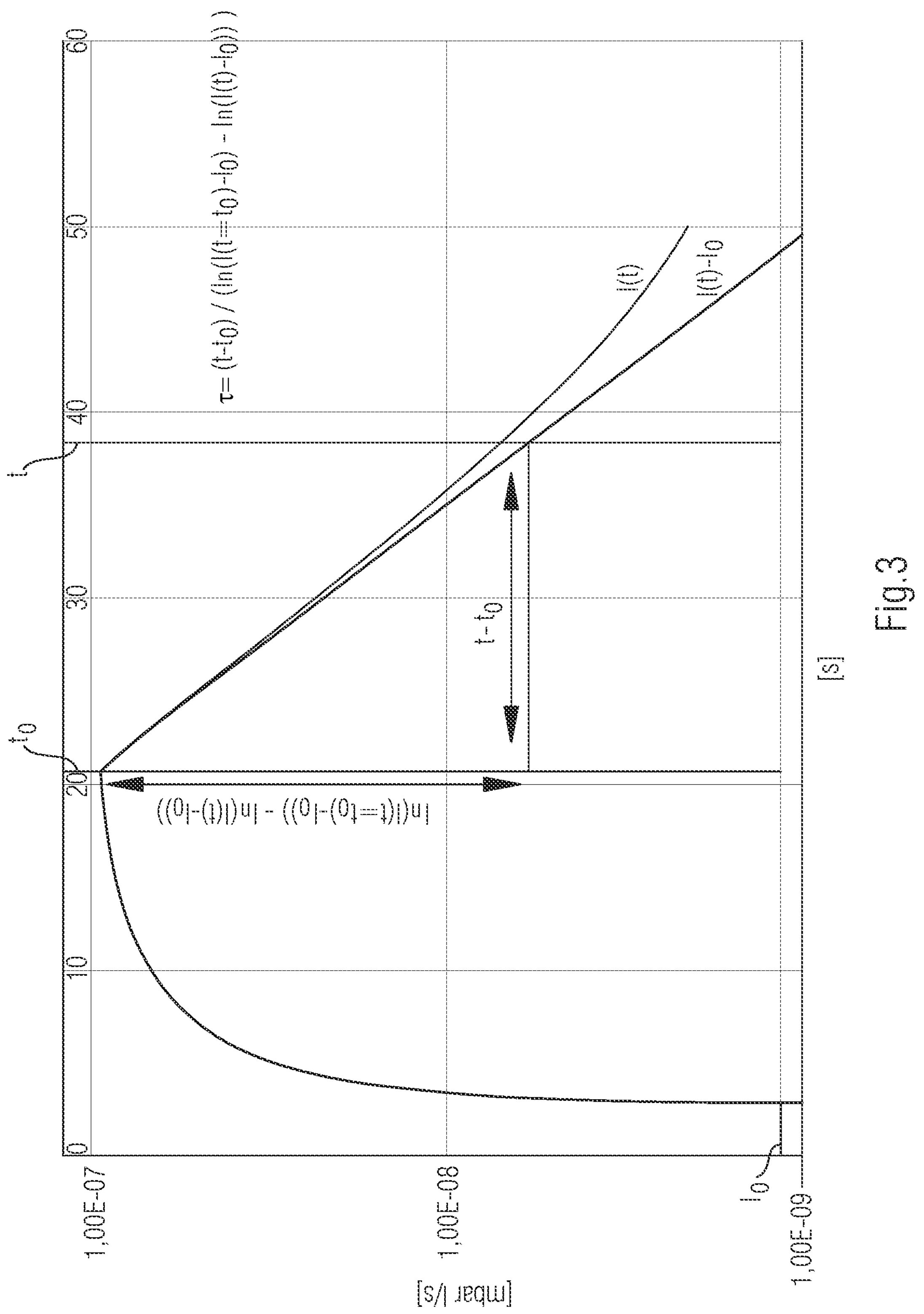
FIG. 3 illustrates an example for the determination of the system time constant of the leak detection system, in which the rise or fall of the logarithmic measuring signal is measured.
Figure 4:
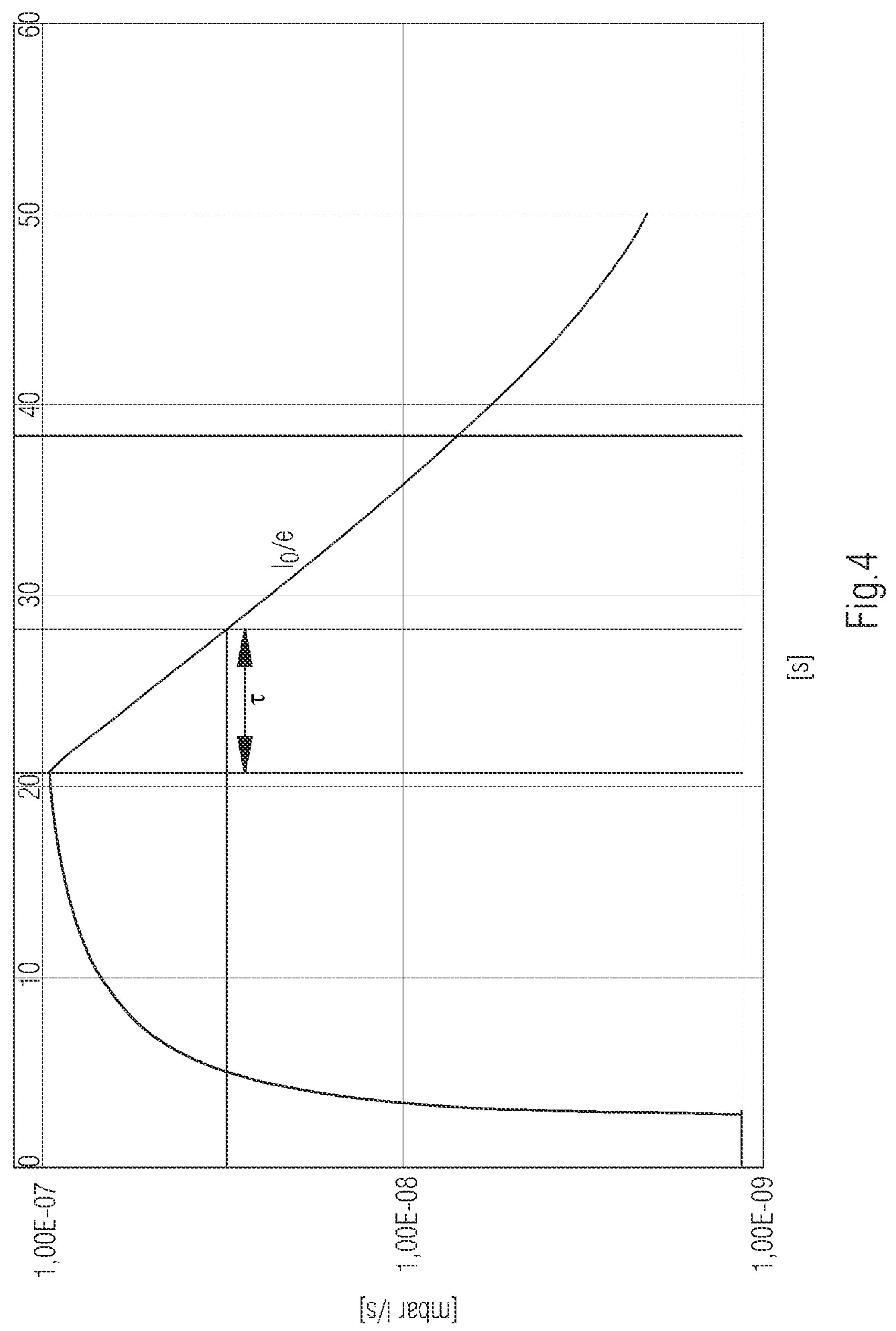
FIG. 4 illustrates an example for a direct determination of the system time constant, in which the time is measured that elapses until the measuring signal has fallen to a 1/e-th part.
Figure 5:
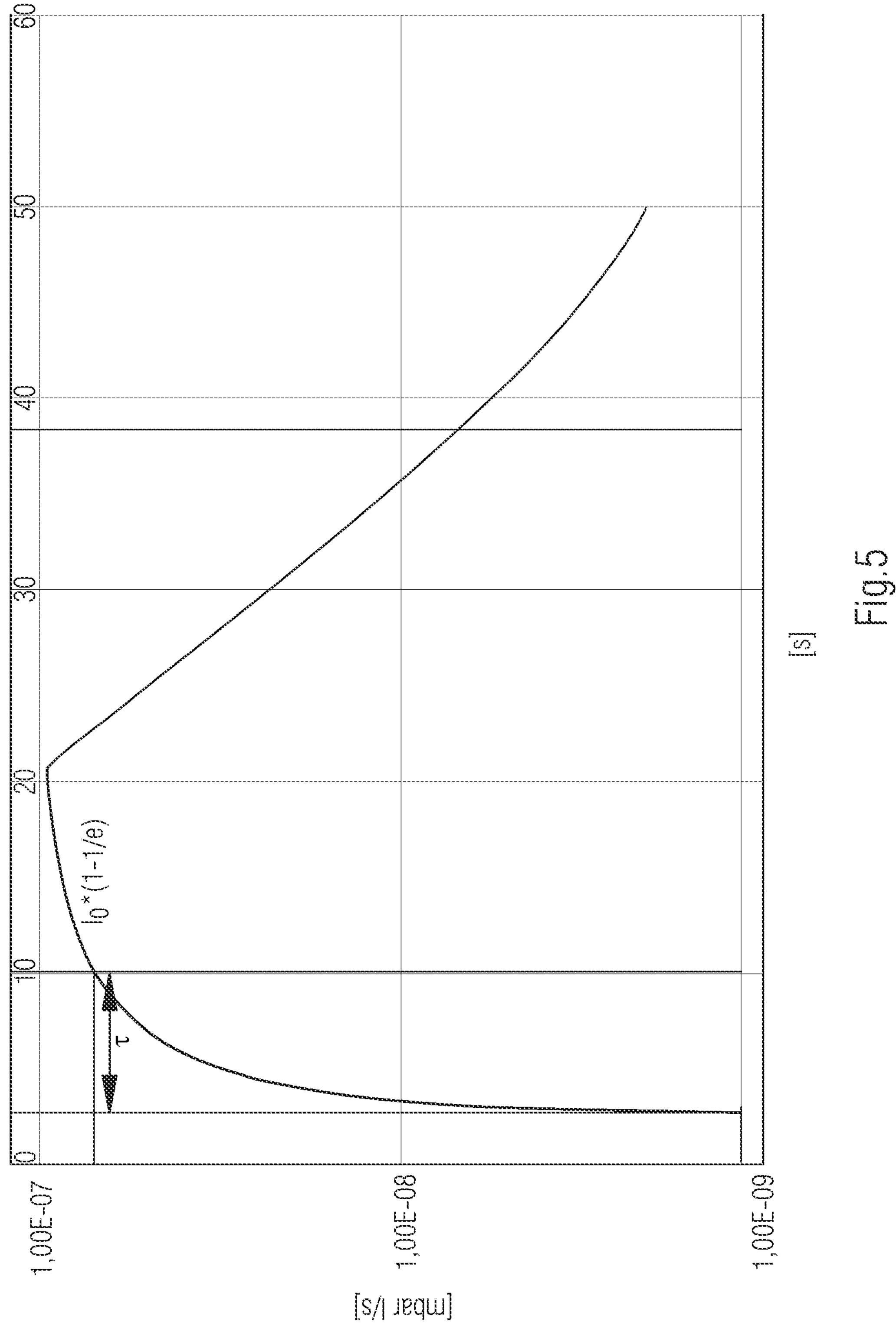
FIG. 5 illustrates an example for the direct determination of the system time constant, in which the time is measured that passes until the measuring signal has risen to a (1-1/e)-th part.
Figure 6:
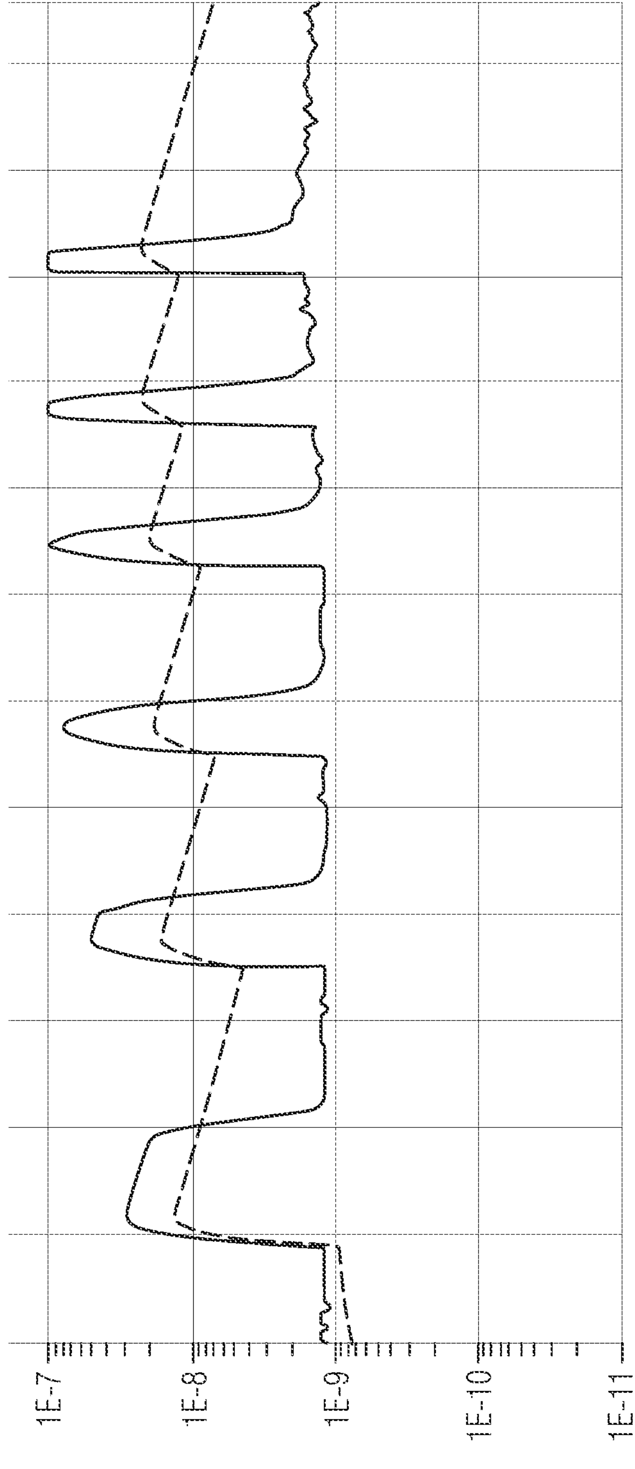

FIG. 6 shows an example for a filtering of the measuring signal. Here, a leak is sprayed with $10^{-7}$ mbar l/s. The measuring signal I(t) is shown in blue/broken lines. The accelerated transformed signal Í(t) is shown in red. The signal time constant of the original signal I of t shown in broken lines is 17.5 seconds. In FIG. 6, from left to right, the system time constants of the transformed signal Í(t) for acceleration factors 1.75; 3.5; 5.83; 8.75; 17.5; 35: 10; 5; 3; 2; 1; 0.5 seconds.

The invention claimed is:

1. A method for evaluating the measuring signal of a vacuum leak detector comprising a vacuum pump and a test chamber connected with the vacuum pump and a gas detector connected with the test chamber, characterized by determining the system time constant $\tau$ of the vacuum leak detector, wherein the system time constant $\tau$ is the duration of the system-related rise of the measured signal in response to a gas component escaped through a leak in the test object or the duration of the system-related drop of the measured signal in response to a gas component no longer from a leak in the test object, followed by the steps of:

generating a measuring signal I(t) of the gas drawn from the test chamber at a time t, using the gas detector, buffering the measured signal I(t), forming a measuring signal Í(t+t0) prognosed for a future time t+t0, based on the measured value of the buffered measuring signal I(t) and the system time constant $\tau$, where t0<$\tau$, generating a measuring signal I(t+t0) of the gas drawn from the test chamber at a time t+t0, using the gas detector, forming the difference between the measuring signal I(t+t0) and the prognosed measuring signal Í(t+t0), judging, whether the test object has a leakage, based on the difference formed.

2. The method according to claim 1, wherein a leak in the test object is considered as detected, if the difference is greater than a threshold value.

3. The method according to claim 2, wherein the threshold value is assumed to be r-times the value of a background signal of the measuring signal, where r is a rational number greater than zero and preferably greater than or equal to 5 and/or smaller than or equal to 10.

4. The method according to claim 1, wherein the test object is considered to be tight, when the difference is smaller than or equal to a threshold value and greater than or equal to zero.

5. The method according to claim 1, wherein an error is assumed, for example in the form of an inaccurate system time constant, when the difference is smaller than zero.

6. The method according to claim 1, wherein the accelerated measuring signal Í(t) is formed from the measuring signal I(t) by the following transformation:

using a previous measuring signal I(t') of a previous time $t'=t-\tau/n$, where n is a rational number greater than 0, multiplying the previous measuring signal I(t') by a second constant C2, forming the difference I(t)–C2 I(t') between the measuring signal I(t) and the previous measuring signal I(t') scaled by the second constant C2, multiplying the difference I(t)–C2 I(t') by a first constant C1, to thereby obtain a measuring signal Í accelerated by the factor n, which corresponds to a measuring signal compensated by the system time constant τ.

7. The method according to claim 6, wherein the second constant C2 is a positive real number smaller than 1 and corresponding preferably to the reciprocal $1/\sqrt[n]{e}$ of the n-th root of Euler's number e or including this reciprocal.

8. The method according to claim 6, wherein the first constant C1 is a real number greater than 1 and preferably includes or corresponds to the term $1/(1-1/\sqrt[n]{e})$.

9. The method according to claim 1, wherein the second constant C2 includes the n-th root of Euler's number e and preferably includes the reciprocal of the n-th root of e.

10. The method according to claim 1, wherein the second constant C2 is multiplied by a factor F, where F is a rational number <1 and is preferably between 0.9 and 0.999.

11. The method according to claim 1, wherein the accelerated signal Í(t) is calculated using the formula:

$$\dot{I}(t) = \left(\left(I(t) - F\frac{I\left(t-\frac{\tau}{n}\right)}{\sqrt[n]{e}}\right)\frac{1}{\left(1-\frac{1}{\sqrt[n]{e}}\right)}\right)$$

12. The method according to claim 1, wherein the system time constant τ is determined by means of a test leak which may be an internal test leak of the vacuum leak detector or an external test leak that can be connected with the test chamber.

13. The method according to claim 1, wherein the vacuum time constant of the vacuum leak detector is calculated as the system time constant τ from the volume of the test chamber and the pipe line connecting the test chamber with the gas detector and from the suction capacity of the vacuum pump.

14. The method according to claim 1, wherein the system time constant τ is determined from that time period which elapses from the time of switching off, deactivating or removing a test leak from the vacuum leak detector to the decay of the measuring signal to a predetermined value, or which elapses from the time of switching on, activating or adding a test leak to the vacuum leak detector to the rising of the measuring signal to a predetermined value.

15. The method according to claim 1, wherein the predetermined time corresponds to the time at which the measuring signal corresponds to 1/e times the steady measuring signa of the test leak.

16. A vacuum leak detector for performing the method according to claim 1, comprising a vacuum pump, a test chamber connected with the vacuum pump and a gas detector connected with the test chamber, characterized by an evaluation unit for evaluating the measuring signal of the gas detector, wherein the evaluation unit is configured to perform the method according to claim 1.

17. The vacuum leak detector according to claim 16, wherein the evaluation unit comprises a memory in which the process steps are stored.

18. The vacuum leak detector according to claim 16, wherein the evaluation unit comprises a microcontroller configured to perform the method in an automated manner.

* * * * *